United States Patent
Campanelli

[15] 3,683,635
[45] Aug. 15, 1972

[54] FREEZE STABILIZED INSULIN

[72] Inventor: Mario Campanelli, 77 Rosewood Drive, West Seneca, N.Y. 14224

[22] Filed: Dec. 7, 1970

[21] Appl. No.: 95,983

Related U.S. Application Data

[63] Continuation-in-part of Ser. No. 53,000, July 7, 1970, abandoned.

[52] U.S. Cl. .............................62/64, 128/1, 195/1.7
[51] Int. Cl. ...............................................F25d 17/04
[58] Field of Search ...........................62/62–66, 74; 195/1.7, 1.8; 128/1; 34/5

[56] References Cited

UNITED STATES PATENTS

| | | | |
|---|---|---|---|
| 3,431,745 | 3/1969 | Harper et al. | 62/63 |
| 2,875,588 | 3/1959 | Berger | 62/74 |
| 2,380,339 | 7/1945 | Siedentopf | 34/5 X |
| 2,659,986 | 11/1953 | Hink | 34/5 |
| 2,655,007 | 10/1953 | Lazar | 62/381 X |
| 3,303,662 | 2/1967 | Moline | 62/62 |
| 3,092,974 | 6/1963 | Haumann et al. | 62/62 |
| 3,347,745 | 10/1967 | Rinfret et al. | 62/66 X |

*Primary Examiner*—Meyer Perlin
*Assistant Examiner*—Ronald C. Capossela
*Attorney*—Christel & Bean

[57] ABSTRACT

The present invention provides a process whereby the drug insulin can be stored for an indefinite period of time without any loss of its physical, chemical or pharmaceutical characteristics. The drug solution is instantly frozen as, for example, in liquid nitrogen, and stored below the solution freezing point until it is needed. It is then thawed and ready for use. Its efficacy has been proved on rabbits and a depancreatized dog.

2 Claims, No Drawings

FREEZE STABILIZED INSULIN

This application is a continuation-in-part of applicant's copending application, Ser. No. 53,000, filed July 7, 1970 now abandoned.

The present invention relates to a method for the stabilization of insulin so that it can be stored for prolonged periods without loss of efficacy or alteration of physical, chemical or pharmaceutical properties. More particularly, it relates to a method for flash freezing insulin solutions with extreme rapidity, so that the physical, chemical, and pharmaceutical properties are not altered, to provide a stable product which can be stably stored for indefinite periods at temperatures which maintain the frozen condition, and which can be thawed to provide an injectable insulin solution of unaltered properties.

Insulin, a protein with a molecular weight of 5,734, first discovered by Banting and Best at the University of Toronto in 1922, is a drug used in the treatment and control of diabetes mellitus, a disease which afflicts approximately 25 percent of the people in the United States. In the human pancreas insulin is manufactured by the beta cells of the Islet of Langerhans. Insulin is important in the metabolism of carbohydrates (sugar and starches) in the body and when the pancreas fails to produce the insulin, diabetes mellitus results. Commercial preparations of insulin are made from beef and hog pancreas. Since insulin is a protein, it cannot per se be taken orally because it is digested by the proteolytic enzymes pepsin and trypsin found in the gastrointestinal tract and rendered inactive. It therefore must ordinarily be taken by injection.

The insulin available for use today is made by large drug companies in the U.S. It is bottled in liquid form and distributed to pharmacies throughout the U.S. However, due to decomposition, spoilage, etc. even though it is refrigerated, if it is not used before the expiration date printed on the bottle, the pharmacy must return it to the drug company, who will destroy it as unfit for human use. Therefore, each day throughout the year pharmacies throughout the U.S. and the world are returning expired, unsold, unused insulin to the drug companies. This undoubtly produces a large loss on the part of the drug companies and unneeded expense to the patients requiring insulin.

It has now been found that injectable solutions of insulin can be frozen under certain conditions and maintained in the frozen state for prolonged periods of storage without deterioration, thawed for injection without alteration of physical, chemical or pharmaceutical properties, with maintenance of the efficacy of the time at which it was first frozen. The thawed solution can be injected at once, or can be kept for the period it would have been considered good at the time it was first frozen, i.e., the normal expiration period resumes at the point at which it was suspended.

Current practice and regulation prohibits freezing insulin because of physical and chemical deterioration, and the consequent loss of physiological activity, which occur during the freezing process. Such prohibitions have heretofore been wise and necessary and remain so if proper freezing technique is not employed since deteriorated insulin will not effectively arrest the diabetic condition, resulting in a coma or death. It has been found, however, that if the freezing process is sufficiently rapid, the deterioration which occurs under normal freezing processes does not occur, and the insulin retains its full potency and efficacy. In order to attain sufficient rapidity, the insulin, preferably in injectable form, i.e., a conventional injectable solution, and preferably packaged for sale, is subjected to extreme low temperatures until frozen. A convenient and relatively inexpensive technique is to immerse the solution in appropriate containers into a bath of liquid nitrogen, at a maximum temperature of about 320.4° F., until frozen, i.e., for at least about 3 to 3.5 seconds per cc. While a liquid nitrogen bath is a convenient and relatively inexpensive manner of attaining sufficient rapidity in the freezing process, any other mode of operation which will result in a comparably rapid freeze can be utilized.

The frozen insulin composition need not be stored at the temperature of the freezing process, any convenient temperature which will maintain the composition in frozen conditions being adequate. Since the freezing point of injectable insulin compositions is ordinarily about 10°–15°F., storage at about 0°–10°F. is quite satisfactory. The frozen composition is prepared for injection merely by exposure to ambient temperatures until completely thawed.

So long as the composition remains frozen, it can be stored. Thus it can be conveniently stockpiled by the manufacturer or a pharmacy, or even by the patient in a home freezer until needed for use. Once thawed, the insulin must be used within the normal expiration period, and must not be refrozen except in accordance with the process of the present invention. If the insulin is so refrozen, the expiration period is again suspended, but it should be noted that the period is cumulative for all periods while the composition is not in the frozen state.

The operation of the process of the present invention is illustrated by the following specific example, which should be considered only as an illustrative embodiment and not limiting of the proper scope of the invention. Still other embodiments will occur to those skilled in the art, and while the following example is considered the best mode of practicing the invention, other modes of operation should not be excluded from the scope of the present invention.

EXAMPLE I

A sealed 10 cc glass bottle of a fresh commercial insulin solution at +48°F was immersed in a liquid nitrogen bath for a period of about 20 minutes at a temperature of −320.4°F. The bottle was then transferred to a freezer maintained at a temperature varying from about 0°F to +10°F.

About 30 days later, the bottle was removed from the freezer and allowed to thaw at ambient temperature for a period of about 1 hour, then continuously refrigerated at about 38°F. The insulin at that point had the normal appearance of a fresh insulin solution. The insulin solution was then tested for physiologic activity, as follow:

A 3-month old male rabbit weighing about 5 pounds was employed. Immediately prior to insulin injection, a cardiac blood sample (5 cc.) was taken, and 20 units of insulin (0.25 cc. of solution) were injected intramuscularly. Further cardiac blood samples were taken at onehalf hour, 1 hour and 2 hours after the injection. The initial sample was found to contain 106 mg percent (i.e., milligrams per 100 cc), while the subsequent samples were found to contain, sequentially, 52 mg percent, 44 mg percent, and 44 mg percent. The rabbit suffered no unusual consequences or side effects, and, at 6 months after the test, remains alive and well.

EXAMPLE II

A procedure similar to that of Example I was conducted with a sealed 10 cc glass bottles of a fresh commercial insulin preparation. The bottles were immersed in liquid nitrogen for a period of about 90 seconds and then transferred to a freezer at about 0° to 10° F where it was stored for about 3 months.

A pancreatectomy was conducted upon a 22-pound male beagle via a midline incision. There was some duodenal cyanosis during the procedure, but the animal came through the surgery well.

One of the foregoing bottles of frozen insulin was thawed for 1 hour at ambient temperature, and at about 1 hour after the conclusion of the pancreatectomy, 8 units of the thawed insulin was administered to the animal.

At about 8 hours after surgery, the dog's urine proved negative when tested for sugar, and the dog was given water with sugar. Thereafter, the dog was maintained on a balanced diet of meat, vitamins, and mineral supplements and 16 units per day of the insulin of the procedure of the present example, which was thawed as needed and thereafter refrigerated at about 38° F. The dog's urine maintained negative or trace sugar content, and the animal remained frisky and healthy. No adverse side effects were noted.

The foregoing examples illustrate the operation of the present invention, and show that the freezing technique effectively stabilizes insulin preparations for long term storage with no loss of potency or efficacy, and with no alteration of the physiological properties.

What is claimed is:

1. The method of stabilizing aqueous injectable insulin compositions comprising immersing the compositions in liquid nitrogen for a period of at least about 3 seconds per cc of insulin composition, and maintaining said compositions at a temperature below their freezing point.

2. the method of stabilizing aqueous injectable insulin compositions comprising immersing the compositions in liquid nitrogen for a period of at least about 3 seconds per cc of insulin composition, and storing said compositions at a temperature below about 10°F.

* * * * *